Sept. 10, 1968   P. BAUER   3,400,908
THROTTLE VALVE CONSTRUCTION
Filed Jan. 8, 1965   2 Sheets-Sheet 1

INVENTOR
PETER BAUER

BY *Hurwitz & Rose*

ATTORNEYS

Sept. 10, 1968 P. BAUER 3,400,908
THROTTLE VALVE CONSTRUCTION
Filed Jan. 8, 1965 2 Sheets-Sheet 2

INVENTOR
PETER BAUER

BY *Hurvitz & Rose*

ATTORNEYS

United States Patent Office 3,400,908
Patented Sept. 10, 1968

3,400,908
THROTTLE VALVE CONSTRUCTION
Peter Bauer, Germantown, Md., assignor to Bowles Engineering Corporation, Silver Spring, Md., a corporation of Maryland
Filed Jan. 8, 1965, Ser. No. 424,319
8 Claims. (Cl. 251—58)

The present invention relates to throttle valves and, more particularly, to a throttle valve having a differential pressure responsive motor and lever actuator means for controlling the operation of said valve.

The throttle valve embodying this invention has many useful applications wherein it is desirable to vary or regulate the flow rate or pressure in a fluid system and, specifically, the valve and control means of the present invention allows me to control fluid flow through a relatively wide range of values from a differential pressure signal that has a smaller, more limited range of variation. For example, I propose to provide a valve that is particularly useful for varying the fluid flow in the control ducts of an otherwise pure fluid system where the most powerful control signals obtainable in terms of pressure and mass flow are desired, such as in the control ducts of the pure fluid amplifier described by Francis M. Manion in the copending application Ser. No. 329,439, filed Dec. 10, 1963, now Patent No. 3,282,279, entitled "Input and Control Systems for Staged Fluid Amplifiers." Further, and in accordance with the present invention, a substantially linear variation in fluid pressure and mass flow can be obtained in response to a minimum amount of force in the form of a relatively small differential pressure change so that the device of the present invention is both very accurate and sensitive.

According to one aspect of my invention, a valve actuator construction that is extremely simple and compact and that requires a minimum amount of mechanical motion is provided so that the device is highly reliable and takes up little space; which are desirable features in any fluid system and particularly in the new predominantly pure fluid systems. The relatively few parts employed lend themselves to easy and economical manufacture and assembly and afford the minimum amount of friction losses. Further, the present construction is such that the actuator parts do not require machining to close tolerances and therefore will not tend to become fouled or clogged by chemical deposits from the fluid that actuates the same.

According to another aspect of my invention, I propose to provide a diaphragm motor which has a novel seat for the diaphragm in that it conforms to the contour of said diaphragm in varying proportions over the full range of differential pressure signals, and in conjunction with a centrally located valve plug on the diaphragm provides a fail-safe feature whereby I can utilize fluid signals that are subject to extreme overpressures without fear of overcontrolling or possibly damaging any part of the system. This feature of the invention gives excellent results and advantages in terms of reliability and life of the thin diaphragm without the usual heavy metal protective washer discs or plates, as well as affording protection for the nondominating pressure source from invasion of foreign fluid through leakage or failure during an overpressure condition of the dominating pressure source.

Accordingly, it is an object of this invention to provide an accurate and sensitive throttle valve requiring a minimum amount of force to actuate the same.

It is an object of this invention to provide a throttle valve and control means for actuating the same providing a relatively wide range of pressure and mass flow variation in response to a differential pressure signal having a more limited range of variation.

Another object of this invention is to provide a throttle valve device including a differential pressure responsive motor and associated leverage means that is simple and compact and that requires a minimum number of moving parts.

Still another object of this invention is to provide a control means for actuating a throttle valve having a lever actuator that does not require machining and close tolerances and which, therefore, is cheaper to construct and generally unaffected in its operation by chemical deposits.

Still another object of this invention is to provide an extremely sensitive diaphragm motor for control means that does not require protective washer discs and is safe to extreme overpressures.

The above and still further objects, features and advantages of the present invention will become apparent upon consideration of the following detailed description of one specific embodiment thereof, especially when taken in conjunction with the accompanying drawings, wherein.

Figure 1:
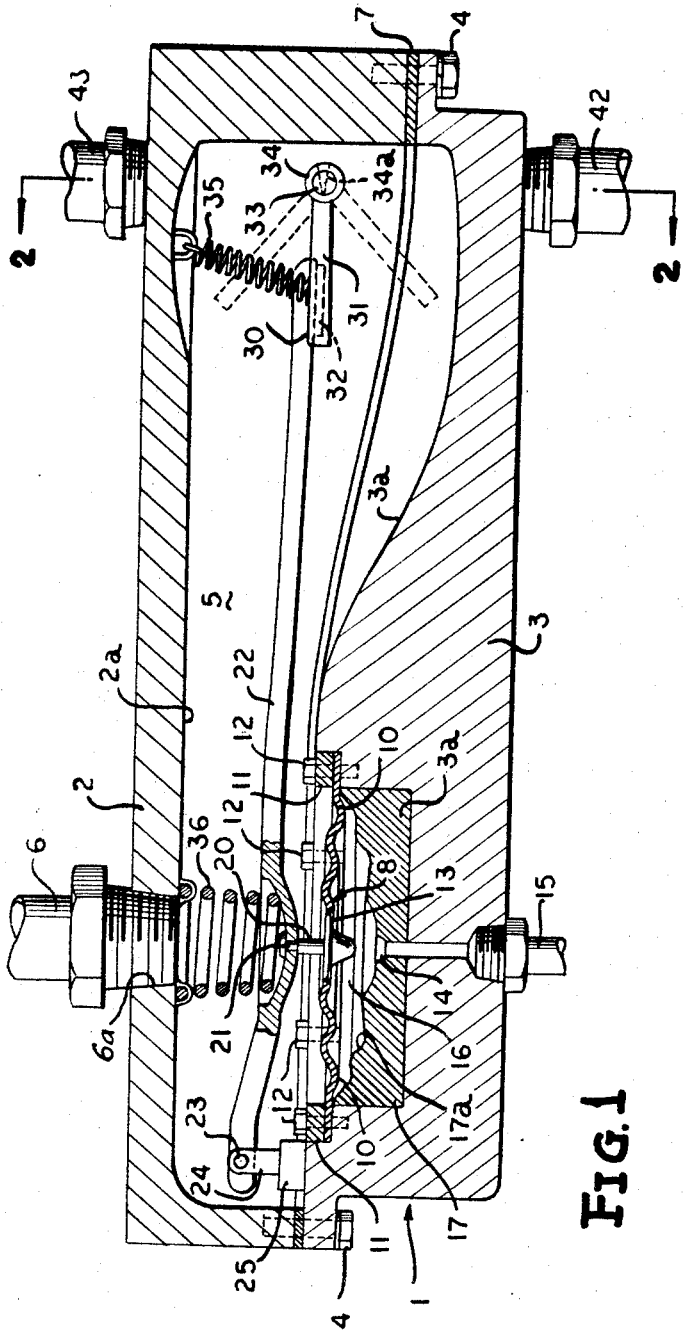
FIGURE 1 is a longitudinal sectional view through the motor and actuator means of the device embodying the principles of the present invention.

Having reference to the drawings, the housing for the throttle valve and the control means for actuating the same is generally indicated by the reference numeral 1, and preferably includes two sections; an upper portion 2 having an inner wall 2a, and a lower portion 3 having an inner wall 3a, suitably fastened together by any number of bolts or the like, as indicated by reference number 4. The housing 1 is thus provided with a chamber 5 forming an enclosure for certain control apparatus for the throttle valve which will be described later, said chamber being adapted to receive operating fluid under pressure via supply or conduit tube 6 fixed in orifice 6a. A suitable gasket forms an air-tight seal between the upper and lower sections 2, 3 so that the chamber 5 may be pressurized to operate a diaphragm, generally designated by reference number 8 (FIGURE 1) and now to be described.

The diaphragm 8 is formed of thin metal, rubber or the like and is designed with a generally circular and thin flexible portion 10, which is mounted around its periphery on the inner walls 3a of the lower housing portion 3 by mounting block 11 and any number of bolts 12. The center of the diaphragm 8 is reinforced in the form of a substantially rigid valve plug 13, the lower portion of which is designed for self-alignment with an inlet orifice 14, which is adapted to supply operating fluid via a second supply conduit 15 to a second chamber 16. The latter is formed along the inner wall 3a of the lower portion 3 by a premolded seat block 17 having contoured seat 17a adapted to receive the diaphragm 8 in conforming relationship.

The aforementioned seat block 17 is preferably formed of epoxy resin, although other plastic materials could conceivably be used. The epoxy resin was found to be particularly suitable for forming the seat for a diaphragm which is subject to high overpressures, due to its good molding properties, fast setting time, hardness and high compressive strength. The block 17 is formed from the impression of the diaphragm 8 under the full desired pressure signal to which it is to be subjected so that the latter can be properly supported during a condition of overpressure in chamber 5.

Figure 1A:
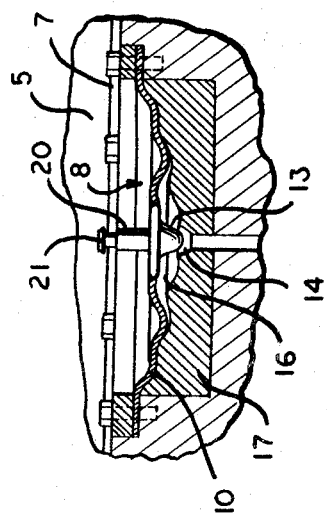
FIGURE 1a is an illustration of the diaphragm motor of FIGURE 1 in the partially actuated position.

In operation, assuming that the pressure in the chamber 5 is dominant, i.e., greater than the pressure in chamber 16, the flexible portion 10 of the diaphragm 8 begins to mate with the outer periphery of the seat 17a, since the center portion or valve plug 13 is restrained by the actuator mechanism, which is to be discussed later. In other words, as the pressure in chamber 5 becomes dominant, the diaphragm 8 mates with the epoxy block 17 from the outside diameter inwards, since the center is held back by the actuator mechanism as it operates the throttle valve (note the partially deflected position as shown in FIGURE 1a). Further increases in the pressure in the chamber 5, and thus an increase in the differential pressure across the diaphragm 8, causes the self-aligning lower portion of the valve plug 13 to seat on the frusto-conical surface of the orifice 14 to form an unbreachable seal between the chamber 5 and the tube 15. In this position, the throttle valve is open to its greatest extent signifiying at least a predetermined maximum differential pressure across the diaphragm 8.

According to the invention, the diaphragm 8 is designed so that the device operates through a full range on approximately ±2½ pounds per square inch differential pressure, which means that the flexible portion 10 of said diaphragm 8 must be relatively thin to afford the requisite sensitivity. According to my invention, this sensitivity is gained without fear of overcontrolling the opening in the throttle valve or breaching the thin, flexible diaphragm portion 10, since my novel conforming seat 17a and valve plug 13 form a positive and "fail-safe" construction, as outlined above. In addition, as extreme overpressures occur in the chamber 5, there can be no invasion and thus contamination of the fluid system associated with the conduit 15 by the fluid of said chamber 5. It should also be observed that, since the diaphragm 8 mates with the seat 17a from the outside diameter inwards, there are no fluid bubbles trapped along the way which might cause failure of said diaphragm 8 or an uneven stretching of the diaphragm and thus inaccurate actuation of the final output element; that is, the throttle valve. This arrangement is further preferred since it eliminates the usual protective washer discs of the prior art thus providing less weight, greater sensitivity and cheaper construction.

Referring once again to the actuator mechanism mentioned above, a rod 20 is provided as preferably an integral part of the valve plug 13 so that it follows the movement of the diaphragm 8 in a reciprocal type movement. The upper portion of the rod 20 is provided with a suitable fastener 21 that secures the rod 20 to an elongated lever 22 which is pivoted about a pivot point at the end closest to the rod 20, identified by a suitable pivot pin 23. Said pivot pin is held in a supporting member 24, which, in turn, is supported by mounting block 25 on the lower housing portion 3.

Figure 2:
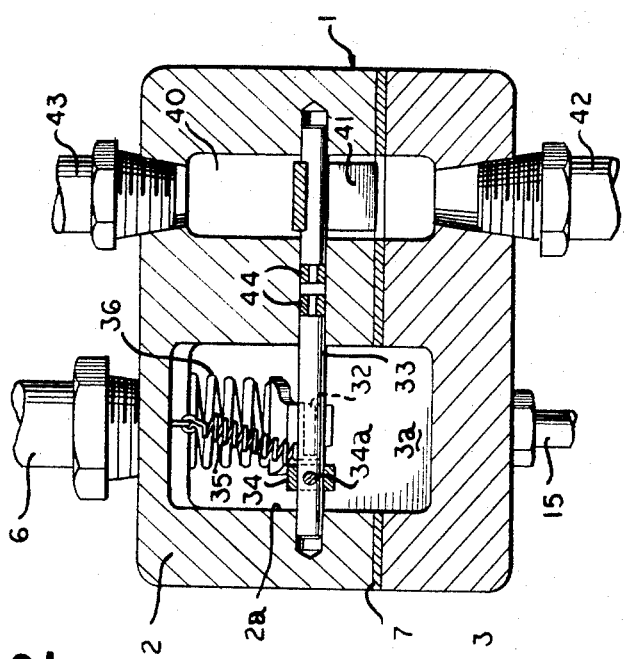
FIGURE 2 is a sectional view through the throttle valve and the associated control arm, taken along line 2–2 of FIGURE 1.

As indicated, the actuator lever 22 extends substantially the full length of the chamber 5 and terminates in an operating portion 30 adjacent the end opposite the pivot point, so that said operating portion 30 moves through a substantial arc in response to a limited movement of the actuator rod 20. The operating portion 30 slidably engages an actuator arm 31 along a flag-shaped portion 32 mounted on the free end of said arm 31. Said arm 31 is fixed to a pivotal throttle valve actuating shaft 33 by a collar and pin 34, 34a, respectively. The shaft 33 extends from the chamber 5 through inner walls 2a of the housing 2, as best illustrated in FIGURE 2. A coil spring 35 can be provided to assist the dynamic forces acting on the throttle valve, which will be considered later, in keeping the arm 31 urged into operating relationship with the lever portion 30. The spring 35 is preferably connected between the flag side of the arm 31 and the upper wall 2a of the housing portion 2 to prevent undue twisting of said arm 31. A range balancing spring 36 of the double acting type is fixed to the rod 20 and the lever 22 by the fastener 21 to stabilize the actuator mechanism and to balance the plus and minus movement of the same. The spring 36 can also serve along with the spring 35, to support the weight of the lever 22 in a normally horizontal position since it is double acting and thus anchored to wall 2a of the upper housing 2. The orifice 6a is within the area of the spring 36 and, thus, the latter further serves to dissipate the dynamic fluid forces entering the chamber 5 via the tube 6 so that the diaphragm 8 does not receive the full force of the initial excursion of fluid entering from tube 6, which might otherwise damage said diaphragm.

Thus, the present actuator construction provides an extremely simple and compact mechanism with a minimum number of moving parts so as to minimize friction losses and to provide maximum sensitivity. Further, the parts can be cheaply manufactured and the mechanism is generally not impaired in its operation due to chemical deposits from the operating fluid because the parts do not have to be machined to close tolerances and can have a degree of clearance which can receive said deposits without clogging. It is also very important to note how easily the present design lends itself to assembly; that is, since the shaft 33, the arm 31 and the springs 35 and 36 are mounted on the upper housing 2 and the lever 22 and diaphragm 8 are mounted on the lower housing 3, the two portions can be easily assembled by slipping the lever 22 over the flag 32 of the arm 31 and then after securing the bolts 4 on the housing the fastener 21 can be placed in position through the orifice 6a before the tube 6 is connected.

Referring now specifically to FIGURE 2, an additional chamber 40 is provided that houses a throttle valve vane 41 which is attached to the throttle valve actuating shaft 33, as indicated. The fluid stream to be controlled by the throttle valve and control means of the present invention enters the chamber 40 through tube 42 and exits by tube 43 and fluid is prevented from migrating between the chambers 5 and 40 along the shaft 33 by conventional O-ring packing 44.

Figure 3:
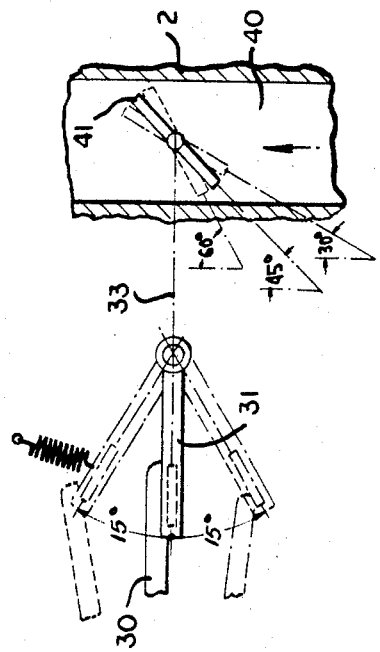
FIGURE 3 is a schematic diagram of the throttle valve and the control arm, illustrated in FIGURE 2, illustrating the angular relationship of the same.

As best illustrated in FIGURE 3, the throttle valve vane 41 is positioned in the chamber 40 so that it can move through a range of approximately ±15° from a central or normal position of 45° with respect to the sides of the chamber 40 to positions of 30° and 60°, representing the fully opened and the fully closed positions, respectively. The reason for positioning the vane 41 as just indicated, is that the area of fluid flow in the chamber 40 varies as a sine function with movement of said vane and since a sine function is substantially linear over the range from 30° to 60°, in the present case, a substantially linear variation in pressure and mass flow is obtained. Thus, according to my invention, I can generate a very good control signal in terms of linearity of variation for a fluid amplifier, for example, in response to a low energy differential pressure signal applied through tubes 6 and 16. Also, high pressure and mass flow levels can be obtained through the chamber 40 so that more desirable signals for fluid amplifiers are generated, as previously mentioned.

The flow of fluid in the chamber 40, represented by the solid arrow in FIGURE 3, generates a clockwise turning movement about the axis of the shaft 33 and, thus, continuously urges the arm 31 into engagement with the operating portion 30 of the lever 22. As previously stated, the spring 35 is advantageously employed to aid this fluid biasing action, whereby the combined biasing force is substantially constant since at the low angle of attack of the vane 41 (FIGURE 3) and, therefore, at the least fluid force generated, the spring 35 is fully extended and, thus, provides its greatest force, and vice versa. The vane 41 is easily and accurately actuated in either a positive or negative direction from the center position (45°)

in accordance with the movement of the lever 22, as well shown in FIGURE 3.

As will be realized, the housing 2 affords an enclosure for the combined motor and lever actuator means, as well as forming the throttle valve chamber 40, thereby making for a very compact and rugged instrument. However, it can be seen that since the actuator construction of the device is particularly simple and rugged in itself, in practice, portions of the housing may be dispensed with in the interest of further simplicity; the motor and control means being thus directly exposed to the pressurized medium, such as, for example, immersed in a body of water.

Assuming that the tubes 6 and 15 are connected with pressure sources intended to control the operation of the throttle valve, it will be apparent that the rod 20 will be moved in the direction, and proportional to the differential pressure across the diaphragm 8; that is, between the chambers 5 and 16. FIGURE 1 illustrates a pressure condition wherein the pressures in the chambers are substantially equal so that the throttle valve control arm 31 is in the neutral position (full line positions of FIGURES 1 and 3). FIGURE 1a, on the other hand, illustrates a condition wherein the throttle control pressure in the chamber 5 dominates the pressure condition in the chamber 16 so that the diaphragm 8 with the integral rod 20 are moved toward the full mating position with the seat 17a. If the pressure in chamber 16 should predominate, then the diaphragm 8 is moved upwardly away from the seat 17a, as viewed in FIGURE 1, and thus the rod 20 is moved upwardly also. As previously pointed out, the total movement of the rod 20 is such as to move the arm 31 through an amplified range of movement of substantially an angle of 30°, corresponding to the total movement of the throttle valve vane 41 in the chamber 40 and, as shown, this results in a substantial pressure and mass flow variation in conduit 43, approaching a linear function of the differential pressure across the diaphragm 8.

Assume further that the fluid in the tube 6 is subject to overpressure conditions in which the pressure in the chamber 5 can go substantially beyond the 5 p.s.i. differential indicated to give maximum deflection. At this point, as previously pointed out, the diaphragm 8 is seated on block 17 and the valve plug 13 is in mating relationship with the orifice 14 so that the throttle valve cannot be over-controlled through the actuator mechanism. The diaphragm 8 and the tube 15 are also safe from failure due to the overpressure condition, for reasons previously given, and accordingly, when the pressure in chamber 5 returns to the operating range, the device of the invention begins to operate as before.

The pressure in tube 15, in accordance with the present invention, can be used merely as a bias pressure whereby the throttle valve is actuated in response to the change in pressure in tube 6. However, in any case, the highest dominating pressure in tube 15 and thus, chamber 16, is limited to a value of less than an overpressure condition, or approximately 5 p.s.i. more than the pressure in chamber 5, so as to prevent deformation of the diaphragm 8. In the alternative, the present invention contemplates that a protective seat similar to the seat 17a could be provided which protects the system from the overpressure condition on this side; that is, when the pressure in chamber 16 predominates, if this type of condition is anticipated.

In practice, it has been found that a degree of hysteresis may well develop when the pressure in the chamber 5 is returning to the operating range from an overpressure condition due to the difference in effective area presented to the two sides of the diaphragm 8, i.e., the area presented at the bottom portion of the valve plug 13 represents the area that the fluid pressure in the tube 15 operates on when said plug is seated, whereas the pressure in chamber 5 effectively operates on at least the area of the top of the valve plug 13, which is larger. The constructions in FIGURES 4 and 5, in accordance with this invention, provide practical solutions that tend to eliminate this hysteresis effect and thus to improve the accuracy of the device.

Figure 4:
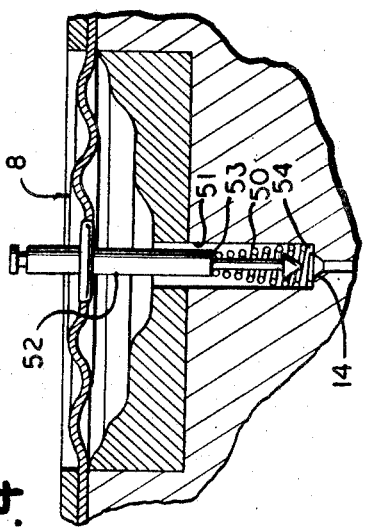

In FIGURE 4, a spring 50 is positioned in channel 51 and surrounds the lower seating portion of stem 52, and this spring 50 is restrained between a shoulder 53 on the stem 52 and a shoulder 54 of the channel 51 just before closing of the orifice 14, whereby it urges the stem 52 and the diaphragm 8 upwardly as the differential pressure approaches the limit of the operating range. Thus, the upward movement of the stem is augmented during this critical portion of the operating range, and therefore, this spring force offsets the difference caused by the different effective areas when the pressure in chamber 5 is just returning from an overpressure condition, so that no appreciable hysteresis effect is now present. Further, seat block 55 can be made of porous material so that the effective area extends over the full area of seat 55a immediately upon the orifice 14 being opened by the combined fluid pressure and spring action.

Figure 5:
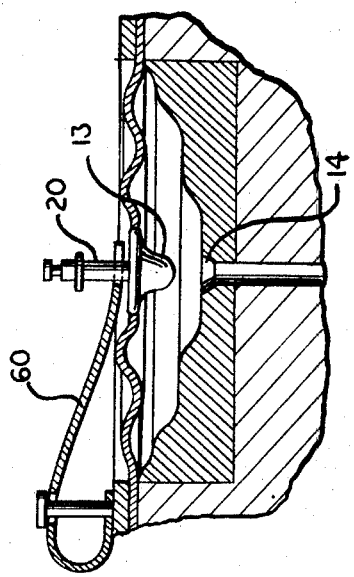
FIGURES 4 and 5 are partial sectional illustrations of the device of FIGURE 1 showing possible modifications of the diaphragm motor.

The modification of FIGURE 5 employs a leaf spring 60 that does not come into effect until the diaphragm plug 13 is just before sealing the orifice 14. Thus, as the washer 61 engages the operative end of the spring 60, it provides a force to the rod 20 equivalent to the highest differential pressure of the operating range so that the plug 13 is removed at this point as the overpressure condition is removed, in essentially the same manner as the embodiment of FIGURE 4.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A control means for actuating a throttle valve comprising a housing having an elongated chamber, a throttle valve actuating shaft extending from one end of said chamber through a wall of said housing, a control arm connected to said shaft, said arm having a free end, and an actuator for said arm including an elongated lever pivoted about a pivot point at the other end of said chamber and terminating in an operating portion adjacent said one end, said operating portion being slidably engageable with said free end of said arm, and a rod substantially perpendicular to said lever and fixed thereto adjacent said pivot point whereby a relatively small actuating movement of said rod generates a substantial movement of said arm.

2. The control means of claim 1 wherein is further included diaphragm means forming a second chamber along a wall of said housing, and a pressure source for supplying pressure fluid to one of said chambers, said diaphragm being operatively coupled to said rod for actuating same in response to said pressure.

3. The control means of claim 1 wherein is further included diaphragm means forming a second chamber along a wall of said housing, a pressure source for supplying pressure fluid to said elongated chamber, said diaphragm being operatively connected to said rod for actuating same in response to said pressure, and spring means mounted between said housing and said elongated lever opposite said rod for stabilizing the movement of said actuator.

4. The control means of claim 3, wherein said pressure source communicates with said elongated chamber through orifice means formed in said housing having its opening positioned within the area of said stabilizing spring whereby the fluid dynamic forces from said pressure source are dissipated.

5. The control means of claim 1, wherein said housing includes an upper portion and a lower portion, said throttle valve actuating shaft and said control arm being mounted in said upper portion and said elongated lever being mounted on said lower portion.

6. In a fluid system having a throttle valve for regulation of fluid flow in response to a differential fluid signal, control means for said valve comprising a pivotal control arm operatively connected to said throttle valve and having a free control end, a control lever pivotally supported at one end and operatively engaging said control arm at the other end, diaphragm means connected to said control lever adjacent said one end and first and second pressure sources formed on opposite sides of said diaphragm for generating said differential pressure across said diaphragm, bias means associated with said control arm for urging same into continuous engagement with said other end of said main lever, wherein said diaphragm means comprises a relatively thin, flexible outer portion and a reenforced center portion, said diaphragm being operatively connected to said control means at said center portion, a housing enclosing said control means, a wall opposite said diaphragm having a contoured surface to match the outline of said outer portion of said diaphragm in the flexed condition so that said outer portion of said diaphragm is safe during an overpressure condition in said first pressure source and an aperture for communicating with said second pressure source for supplying pressure fluid to a fluid chamber formed by said diaphragm and said wall, said aperture being positioned substantially in the center of said wall whereby said reenforced center portion of said diaphragm forms a valve plug for said aperture so that the fluid from said first source is prevented in a fail-safe fashion from communicating with the fluid of said second source during said overpressure condition.

7. In a fluid system having a throttle valve for regulation of fluid flow in response to a differential pressure signal, a chamber, control means for said valve located in said chamber comprising a pivotal control arm operatively connected to said throttle valve and having a free control end, a control lever pivotally supported at one end and operatively engaging said control arm at the other end, diaphragm means dividing said chamber into two pressure-isolated volumes and connected to said control lever adjacent said one end, first and second pressure sources communicating with respective ones of said volumes on opposite sides of said diaphragm for generating said differential pressure across said diaphragm, at least one of said volumes having a wall surface opposite said diaphragm having a contour conforming to the outline of said diaphragm when the latter is displaced due to a smaller pressure existing in said one volume than in the other volume;

said diaphragm means comprising a relatively thin, flexible outer portion and a re-enforced center portion, said diaphragm being operatively connected to said control means at said center portion;

wherein is further provided a housing enclosing said control means, said wall surface opposite said diaphragm being contoured to match the outline of said outer portion of said diaphragm in the flexed condition so that said outer portion of said diaphragm is safe during an overpressure condition in said first pressure source, and an aperture for communicating with said second pressure source for supplying pressure fluid to a fluid chamber formed by said diaphragm and said wall, said aperture being positioned substantially in the center of said wall whereby said re-enforced center portion of said diaphragm forms a valve plug for said aperture so that the fluid from said first source is prevented in a fail-safe fashion from communicating with the fluid of said second source during said overpressure condition.

8. The device of claim 7 wherein is further provided a bias means associated with said control arm for urging same into continuous engagement with said other end of said main lever.

References Cited

UNITED STATES PATENTS

| | | | |
|---|---|---|---|
| 466,275 | 12/1891 | Fasoldt | 251—58 X |
| 1,941,831 | 11/1934 | Ford | 251—238 X |
| 3,061,315 | 10/1962 | Anderson et al. | 251—232 X |
| 2,583,795 | 1/1952 | Pawelsky et al. | 251—58 X |
| 3,251,573 | 5/1966 | Miller et al. | 251—58 X |

ARNOLD ROSENTHAL, *Primary Examiner.*